United States Patent
Sainath et al.

(10) Patent No.: US 9,697,826 B2
(45) Date of Patent: Jul. 4, 2017

(54) PROCESSING MULTI-CHANNEL AUDIO WAVEFORMS

(71) Applicant: Google Inc., Mountain View, CA (US)

(72) Inventors: Tara N. Sainath, Jersey City, NJ (US); Ron J. Weiss, New York, NY (US); Kevin William Wilson, Cambridge, MA (US); Andrew W. Senior, New York, NY (US); Arun Narayanan, Santa Clara, CA (US); Yedid Hoshen, Jerusalem (IL); Michiel A. U. Bacchiani, Summit, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/205,321

(22) Filed: Jul. 8, 2016

(65) Prior Publication Data

US 2016/0322055 A1  Nov. 3, 2016

Related U.S. Application Data

(63) Continuation-in-part of application No. 15/080,927, filed on Mar. 25, 2016.
(Continued)

(51) Int. Cl.
*G10L 15/16* (2006.01)
*G10L 15/06* (2013.01)
(Continued)

(52) U.S. Cl.
CPC .............. *G10L 15/16* (2013.01); *G10L 15/02* (2013.01); *G10L 15/063* (2013.01); *G10L 2021/02166* (2013.01)

(58) Field of Classification Search
CPC .............................. G10L 15/16; G10L 15/083
See application file for complete search history.

(56) References Cited

U.S. PATENT DOCUMENTS 5,737,485 A * 4/1998 Flanagan ................ G10L 15/16
704/232
9,390,712 B2 * 7/2016 Yu ........................... G10L 15/16
(Continued)

OTHER PUBLICATIONS

Palaz, Dimitri, and Ronan Collobert. Analysis of cnn-based speech recognition system using raw speech as input. No. EPFL-report-210039. Idiap, 2015.*
(Continued)

*Primary Examiner* — Brian Albertalli
(74) *Attorney, Agent, or Firm* — Fish & Richardson P.C.

(57) ABSTRACT

Methods, including computer programs encoded on a computer storage medium, for enhancing the processing of audio waveforms for speech recognition using various neural network processing techniques. In one aspect, a method includes: receiving multiple channels of audio data corresponding to an utterance; convolving each of multiple filters, in a time domain, with each of the multiple channels of audio waveform data to generate convolution outputs, wherein the multiple filters have parameters that have been learned during a training process that jointly trains the multiple filters and trains a deep neural network as an acoustic model; combining, for each of the multiple filters, the convolution outputs for the filter for the multiple channels of audio waveform data; inputting the combined convolution outputs to the deep neural network trained jointly with the multiple filters; and providing a transcription for the utterance that is determined.

20 Claims, 9 Drawing Sheets

Related U.S. Application Data

(60) Provisional application No. 62/190,602, filed on Jul. 9, 2015, provisional application No. 62/139,541, filed on Mar. 27, 2015.

(51) Int. Cl.
  G10L 21/0216 (2013.01)
  G10L 15/02 (2006.01)

(56) References Cited

U.S. PATENT DOCUMENTS

| | | | | |
|---|---|---|---|---|
| 2014/0288928 | A1* | 9/2014 | Penn | G10L 15/16 704/232 |
| 2015/0032449 | A1* | 1/2015 | Sainath | G10L 15/16 704/235 |
| 2015/0095026 | A1* | 4/2015 | Bisani | G10L 15/08 704/232 |
| 2015/0161995 | A1* | 6/2015 | Sainath | G10L 15/16 704/232 |
| 2016/0284346 | A1* | 9/2016 | Visser | G10L 15/16 |
| 2016/0358602 | A1* | 12/2016 | Krishnaswamy | G10L 15/20 |
| 2016/0358619 | A1* | 12/2016 | Ramprashad | G10L 15/34 |

OTHER PUBLICATIONS

Geiger, Jürgen T., et al. "Robust speech recognition using long short-term memory recurrent neural networks for hybrid acoustic modelling." Interspeech. 2014.*

Liu, Yulan, Pengyuan Zhang, and Thomas Hain. "Using neural network front-ends on far field multiple microphones based speech recognition." Acoustics, Speech and Signal Processing (ICASSP), 2014 IEEE International Conference on. IEEE, 2014.*

Renals, Steve, and Pawel Swietojanski. "Neural networks for distant speech recognition." Hands-free Speech Communication and Microphone Arrays (HSCMA), 2014 4th Joint Workshop on. IEEE, 2014.*

Davis and Mermelstein, "Comparison of Parametric Representations for Monosyllabic Word Recognition in Continuously Spoken Sentences ," IEEE Transactions on Acoustics, Speech and Signal Processing, 28(4):357-366, Aug. 1980.

Dean et al., "Large Scale Distributed Deep Networks," Advances in Neural Information Processing Systems, pp. 1223-1231, 2012.

Glasberg and Moore, "Derivation of auditory filter shapes from notched-noise data," Hearing Research, vol. 47, No. 1, pp. 103-138, Aug. 1990.

Glorot and Bengio, "Understanding the Difficulty of Training Deep Feedforward Neural Networks," International Conference on Artificial Intelligence and Statistics (AISTATS), 2010, pp. 249-256.

Hain et al., "Transcribing Meetings with the AMIDA Systems," IEEE Transactions on Audio, Speech, and Language Processing, vol. 20, No. 2, pp. 486-498, Feb. 2012.

Heigold et al., "Asynchronous Stochastic Optimization for Sequence Training of Deep Neural Networks," Acoustics, Speech and Signal Processing (ICASSP), 2014 IEEE International Conference on pp. 5587-5591, May 2014.

Hochreiter and Schmidhuber, "Long Short-Term Memory," Neural Computation, vol. 9, No. 8, pp. 1735-1780, 1997.

Hoshen et al., "Speech Acoustic Modeling from Raw Multichannel Waveforms," International Conference on Acoustics, Speech, and Signal Processing, IEEE, Apr. 2015, pp. 4624-4628.

Huang et al., "An Analysis of Convolutional Neural Networks for Speech Recognition," Acoustics, Speech and Signal Processing (ICASSP), 2015 IEEE International Conference on. IEEE, Apr. 2015, pp. 4989-4993.

Jaitly and Hinton, "Learning a Better Representation of Speech Sound Waves Using Restricted Boltzmann Machines," in Proc. ICASSP, 2011, 4 pages.

Kim and Chin, "Sound Source Separation Algorithm Using Phase Difference and Angle Distribution Modeling Near the Target," in Proc. Interspeech, 2015, 5 pages.

Mohamed et al., "Understanding how Deep Belief Networks Perform Acoustic Modelling," in ICASSP, Mar. 2012, pp. 4273-4276.

Palaz et al., "Estimating Phoneme Class Conditional Probabilities From Raw Speech Signal using Convolutional Neural Networks," in Proc. Interspeech, 2014, 5 pages.

Patterson et al., "An efficient auditory filterbank based on the gammatone function," in a meeting of the IOC Speech Group on Auditory Modelling at RSRE, vol. 2, No. 7, 1987, 33 pages.

Sainath et al., "Convolutional, Long Short-Term Memory, Fully Connected Deep Neural Networks," Acoustics, Speech and Signal Processing (ICASSP), 2015 IEEE International Conference on, pp. 4580-4584, Apr. 2015.

Sainath et al., "Deep Convolutional Neural Networks for LVCSR," in Proc. ICASSP, May 2013, 5 pages.

Sainath et al., "Improvements to Deep Convolutional Neural Networks for LVCSR," Automatic Speech Recognition and Understanding (ASRU), 2013 IEEE Workshop on, pp. 315-320, Dec. 2013.

Sainath et al., "Learning the Speech Front-end with Raw Waveform CLDNNs," Interspeech, Sep. 2015, pp. 1-5.

Sak et al., "Long Short-Tenn Memory Recurrent Neural Network Architectures for Large Scale Acoustic Modeling," in Proc. Interspeech, pp. 338-342, Sep. 2014.

Schluter et al., "Gammatone Features and Feature Combination for Large Vocabulary Speech Recognition," Acoustics, Speech and Signal Processing, 2007. ICASSP 2007. IEEE International Conference on, pp. IV-649-IV-652, Apr. 2007.

Seltzer et al., "Likelihood-maximizing Beamforming for Robust Handsfree Speech Recognition," IEEE Transactions on Audio, Speech and Language Processing, No. 5, pp. 489-498, Sep. 2004.

Soltau et al., "The IBM Attila speech recognition toolkit," in Proc. IEEE Workshop on Spoken Language Technology, 2010, Dec. 2010, pp. 97-102.

Stolcke et al., "The SRI-ICSI Spring 2007 Meeting and Lecture Recognition System," Multimodal Technologies for Perception of Humans, vol. Lecture Notes in Computer Science, No. 2, pp. 450-463, 2008.

Swietojanski et al., "Hybrid Acoustic Models for Distant and Multichannel Large Vocabulary Speech Recognition," Automatic Speech Recognition and Understanding (ASRU), 2013 IEEE Workshop on. IEEE, Dec. 2013, pp. 285-290.

Tuske et al., "Acoustic Modeling with Deep Neural Networks using Raw Time Signal for LVCSR," in Proc. Interspeech, Sep. 2014, pp. 890-894.

* cited by examiner

PROCESSING MULTI-CHANNEL AUDIO WAVEFORMS

CROSS-REFERENCE TO RELATED APPLICATIONS

This application claims priority to U.S. Patent Application Ser. No. 62/139,541, filed on Mar. 27, 2015, and to U.S. Patent Application Ser. No. 62/190,602, filed on Jul. 9, 2015. This application is a continuation-in-part of and claims priority to co-pending U.S. patent application Ser. No. 15/080,927, filed on Mar. 25, 2016, which claims priority to U.S. Patent Application Ser. No. 62/139,541, filed on Mar. 27, 2015.

FIELD

The present specification relates to processing multi-channel audio waveforms.

BACKGROUND

Various techniques can be used to recognize speech. Some techniques use an acoustic model that receives acoustic features derived from audio data.

SUMMARY

In some implementations, a speech recognition system can perform multi-channel processing, e.g., beamforming or other spatial filtering, jointly with an acoustic model. For example, to perform the joint processing, a deep neural network (DNN) that includes a convolutional layer and one or more long short-term memory (LSTM) layers can be used, e.g., a convolutional long short-term memory deep neural network (CLDNN). The CLDNN can receive raw audio waveform data as input rather than manually defined features extracted from the waveforms. Using waveform input for multiple audio channels, such as the outputs of multiple microphones, the network can learn to be robust to varying angles of arrival of speech from a target speaker. Also, in some implementations, training the network on inputs captured using multiple array configurations, e.g., different linear array configurations, can produce a model that is robust to a wide range of microphone spacings.

Implementations may include one or more of the following features. For example, in some implementations, a method includes: receiving multiple channels of audio data corresponding to an utterance; convolving each of multiple filters, in a time domain, with each of the multiple channels of audio waveform data to generate convolution outputs, where the multiple filters have parameters that have been learned during a training process that jointly trains the multiple filters and trains a deep neural network as an acoustic model; combining, for each of the multiple filters, the convolution outputs for the filter for the multiple channels of audio waveform data; inputting the combined convolution outputs to the deep neural network trained jointly with the multiple filters; and providing a transcription for the utterance that is determined based at least on output that the deep neural network provides in response to receiving the combined convolution outputs.

Other versions include corresponding systems, and computer programs, configured to perform the actions of the methods encoded on computer storage devices.

One or more implementations may include the following optional features. For example, in some implementations, the multiple channels of audio data are multiple channels of audio waveform data for the utterance, where the multiple channels of audio waveform are recordings of the utterance by different microphones that are spaced apart from each other.

In some implementations, the deep neural network is a deep neural network including a convolutional layer, one or more long-short term memory (LSTM) layers, and multiple hidden layers.

In some implementations, the convolutional layer of the deep neural network is configured to perform a frequency domain convolution.

In some implementations, the deep neural network is configured such that output of convolutional layer is input to at least one of the one or more LSTM layers, and output of the one or more LSTM layers is input to at least one of the multiple hidden layers.

In some implementations, combining the convolution outputs includes: summing, for each of the multiple filters, the convolution outputs obtained for different channels using the filter to generate summed outputs corresponding to different time periods; and pooling, for each of the multiple filters, the summed outputs across the different time periods to generated a set of pooled values for the filter.

In some implementations, pooling the summed outputs across the different time periods includes max pooling the summed outputs across the different time periods to identify maximum values among the summed outputs for the different time periods.

In some implementations, combining the convolution outputs includes applying a rectified non-linearity to the sets of pooled values for each of the multiple filters to obtain rectified values, where inputting the combined convolution outputs to the deep neural network includes inputting the rectified values to the deep neural network.

In some implementations, the rectified non-linearity includes a logarithm compression.

In some implementations, the filters are configured to perform both spatial and spectral filtering.

In some implementations, the training process that jointly trains the multiple filters and trains the deep neural network as an acoustic model includes training the multiple filters and the deep neural network using a single module of an automated speech recognizer.

In some implementations, the training process that jointly trains the multiple filters and trains the deep neural network as an acoustic model is performed using training data that includes audio data from a plurality of different microphone spacing configurations.

Various implementations of the techniques disclosed herein can provide one or more of the following advantages. For example, the joint training of a neural network acoustic model, such as a CLDNN, for both beamforming and acoustic modelling can improve performance relative to other beamforming techniques, such as delay-and-sum beamforming. In matched microphone array configurations, a raw waveform CLDNN is able to learn filters which are steered in different directions, In addition, the raw waveform approach offers improvements in accuracy over multi-channel log-mel DNNs, particularly as the number of channels increases, since the log-mel system cannot exploit fine time structure necessary to do spatial filtering.

As another example, a speech recognition model can be generated that operates effectively with many different microphone spacings. For example, unlike many models that expect inputs to be generated by a specific microphone configuration, a neural network model can be trained without such limitations. For example, by training the neural network model using inputs captured using multiple microphone array configurations, and using the other training techniques discussed below, a model can be generated that is robust to a wide range of microphone spacings. A multi-geometry trained network is largely invariant to microphone spacings, can adapt to unseen channels, and generally outperforms traditional beamforming techniques.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1A:
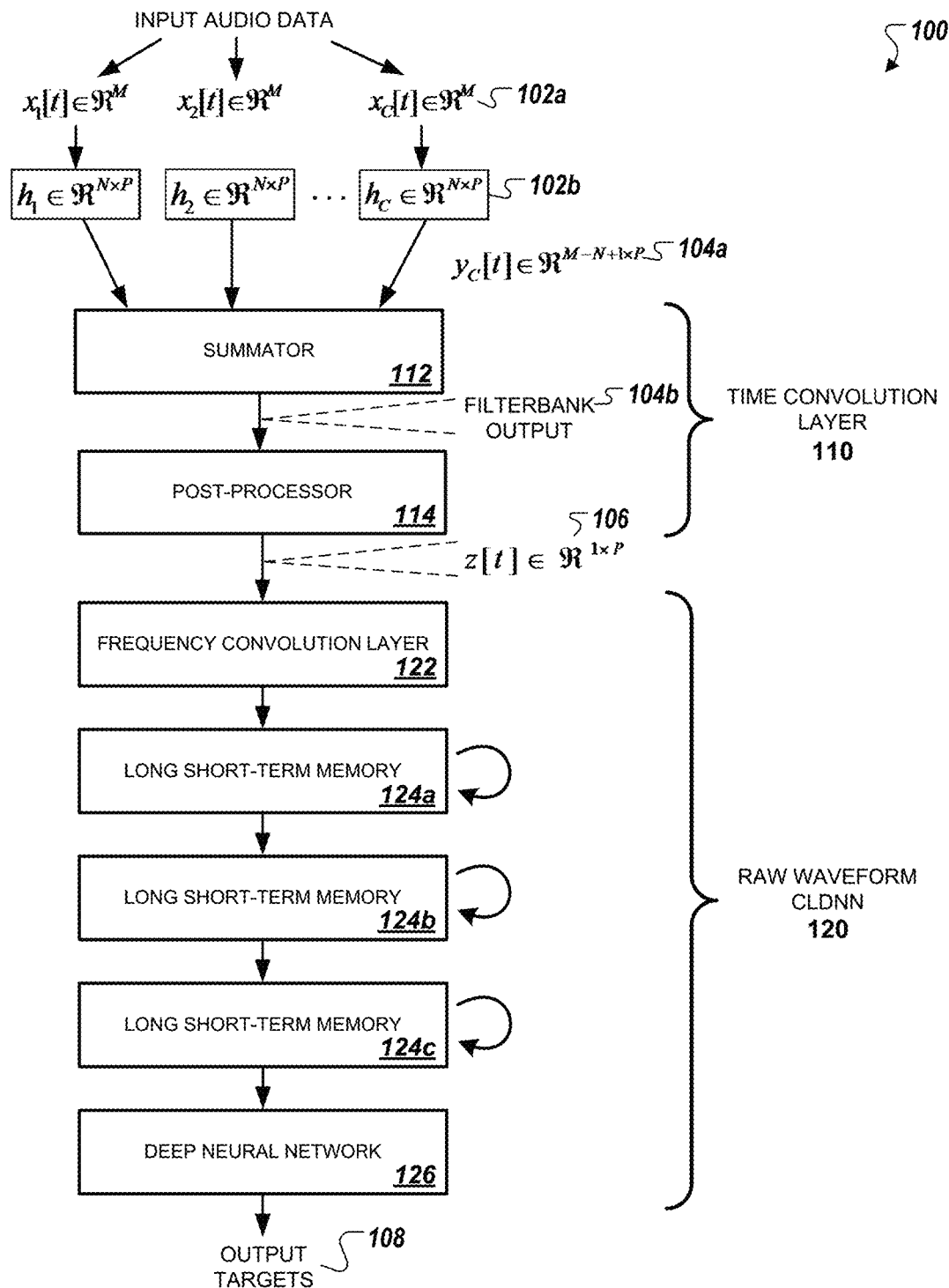
FIG. 1A illustrates a conceptual diagram of an exemplary framework for a convolutional long short-term memory deep neural network.

While some automated speech recognition (ASR) systems may perform reasonably well in closed-talking microphone conditions, performance of such ASR systems may degrade in far-field conditions where there is large distances between the user and the microphone. In such conditions, speech signals are subject to degradation due to reverberation and additive noise. These systems often utilize multiple microphones to improve recognition quality, enhance speech signals and reduce effects due to reverberation and noise.

Some multi-channel ASR systems utilize two separate modules to perform recognition. First, a microphone array speech enhancement is applied, typically via beamforming. The enhanced signal is then passed to an acoustic model. Techniques often include delay-and-sum beamforming, which involves receiving signals from different microphones to adjust for the delay from the target speaker to each of the microphones. The time-aligned signals are then summed to enhance the signal from the target direction and attenuate noise coming from other directions. Other forms of signal enhancement include Minimum Variance Distortionless Response (MVDR), and Multichannel Wiener Filtering (MWF).

The approach of treating enhancement as disjoint from acoustic modeling might not lead to the best solution for improving ASR performance. In addition, many enhancement techniques involve a model-based approach that requires an iterative acoustic model and/or iterative enhancement model parameter optimization. For example, the approaches often first estimate beamforming parameters and then estimate acoustic model parameters. These iterative approaches are not easily combined with other types of models that do not use iterative training. For example, acoustic models based on neural networks are often optimized using a gradient learning algorithm rather than the iterative training techniques used with Gaussian Mixture Models (GMMs) and other models.

Accordingly, one innovative aspect of the subject matter described in this specification can be embodied in a method of performing beamforming jointly with acoustic modeling within the context of a deep neural network (DNN) framework. DNNs are attractive because they are capable of performing feature extraction jointly with classification. Since beamforming requires the fine time structure of the signal at different microphones, raw waveform time domain signals may be processed by the network. Optimizing both the enhancement and acoustic model jointly in this framework can be effective to improve speech recognition accuracy by reducing word error rates.

In some implementations, acoustic models can be learned directly from the raw waveform using a convolutional, long short-term memory, deep neural network (CLDNN) acoustic model. In such implementations, it is possible for a raw waveform CLDNN and a log-mel CLDNN to obtain identical accuracy for a single channel input signals. In some implementations, CLDNNs may be used to perform multi-channel raw waveform processing, thus combining multi-channel processing and acoustic modeling. These CLDNNs may be effective to recognize speech in the presence of significant noise, reverberations, and when there is variation in target speaker location across a set of utterances.

The raw waveform CLDNN may be trained using training data including voice search tasks. In one example, speech used for training was from a 2,000 hour, multi-condition trained with an average signal-to-noise ratio (SNR) of 12 decibels (dB) and an average reverberation time (T60) of 600 ms. As a baseline, a single channel raw waveform CLDNN may be initially trained, and the performance can be evaluated relative to a log-mel CLDNN. In some instances the raw waveform CLDNN exhibits improved performance compared to a log-mel CLDNNs for a given data set. In some instances, the performance may be analyzed to determine performance enhancements with voice search tasks with a lower SNR, increased reverb times, and increased distance between the microphone and the target.

The behavior of the raw waveform CLDNN for multiple channels may then be analyzed. For example, since a component of beamforming is localization, the behavior of the multi-channel raw waveform CLDNN may be compared to (a) delay-and-sum (D+S) beamforming based on the true time delay of arrival (TDOA) of the target followed by a single-channel CLDNN and (b) time-aligning the raw signal based on the true TDOA and then passing the time-aligned signals to a multichannel raw waveform CLDNN (referred to as time-aligned multichannel or TAM). When trained and evaluated on matched microphone array configurations, the raw waveform CLDNN may be able to learn filters that are steered in different directions. In some instances, the multi-channel raw waveform CLDNN performs better than D+S and matches the performance of F+S. Additionally, in some implementations, the raw waveform approach may offer improvements over multi-channel log-mel DNNs, particularly when more channels are used since the log-mel system does not utilize fine time information important to perform spatial filtering.

The multi-channel raw waveform CLDNN may then be trained on different array configurations to ensure that the network is robust to array configuration mismatches. In some instances, the multi-geometry trained network is largely invariant to microphone spacings (e.g., able to perform well with arbitrary microphone spacings), can adapt to unseen channels, and outperforms traditional beamforming techniques.

In general, filter-and-sum (F+S) techniques are generally used for a set of finite impulse response (FIR) filters, which is represented in equation (1) shown below:

$$y[t] = \sum_{c=0}^{C-1} \sum_{n=0}^{N-1} h_c[n] x_c[t-n-\tau_c] \quad (1)$$

In this equation, $h_c[n]$ is the $n^{th}$ tap of the filter associated with microphone, c; $x_c[t]$, is the signal received by microphone c at time t; $\tau_c$ is the steering delay induced in the signal received by a microphone to align it to the other array channels, and y[t] is output signal generated by the processing. C is the number of microphones in the array and N is the length of the FIR filters.

In some instances, enhancement algorithms optimizing the model in equation (1) may generally require a steering delay $\tau_c$ from a localizer model and may subsequently optimize an objective such as MVDR to obtain the filter parameters. Instead of using multiple discrete steps or models, a network may do the steering delay estimation and filter parameter optimization jointly. Different steering delays may be captured by allowing the network to have multiple filters P at each channel. The filter processing for filter output p∈P is given by Equation (2).

The first layer in the raw waveform architecture may be modeled by the equation (2) below:

$$y^p[t] = \sum_{c=0}^{C-1} \sum_{n=0}^{N-1} h_c^p[n] x_c[t-n] \quad (2)$$

The first layer in the raw waveform architecture models Equation 2 and may be used to perform a multi-channel time-convolution with a FIR spatial filterbank $h_c = \{h_c^1, h_c^2, \ldots, h_c^P\}$ where $h_c \in \mathfrak{R}^{N \times P}$ for c∈1, . . . , C. Each filter $h_c^P$ is convolved with a specific input channel $x_c$, and the output for each filter p∈P is summed across all channels c∈C. The operation within each filter p can be interpreted as filter-and-sum beamforming, except it does not first shift the signal in each channel by an estimated time delay of arrival. As discussed below, the network appears effective in learning the steering delay and filter parameters implicitly.

To perform multi-channel processing jointly with acoustic modeling, it is desirable to produce an output that is invariant to perceptually and semantically identical sounds appearing at different phase shifts. These temporal variations present in raw waveforms can be reduced by pooling the outputs after filtering. Specifically, the output of the spatial filterbank can be max-pooled across time to give a degree of short-term phase invariance, and then passed through a compressive non-linearity.

Time-convolution layers can implement a standard time-domain filterbank, such as a gammatone filterbank, which for speech applications is often implemented as a bank of filters followed by rectification and averaging over a small window. Since the time-convolutional layers disclosed herein can do this, the output of this layer is referred to as a "time-frequency" representation, and the outputs of different convolutional units can be considered to correspond to different "frequencies." Therefore, the time-convolution layers do both spatial and spectral filtering together.

FIG. 1A illustrates a conceptual diagram of an exemplary framework for a system 100 including a time convolution layer 110 and a multi-channel raw waveform convolutional long short-term memory deep neural network (CLDNN) 120. Briefly, the system 100 may receive audio data, represented as a set of input signals, from different channels of a microphone array. A set of raw waveforms 102a for the input signals may be extracted, convolved with a set of filters 102b from a spatial filterbank, to generate a processed signal output 104a. The processed signal output 104a may be passed through a time convolution layer 110, which includes a summator 112 and a post-processor 114, to generate a frame-level feature vector 106. The frame-level feature vector 106 may be passed to the raw waveform CLDNN 120, which includes a frequency convolution layer 122, a set of long short-term memory (LSTM) layers 124a-124c, and a deep neural network (DNN) 126. The CLDNN 120 predicts context dependent state output targets 108.

In more detail, the set of raw waveforms 102a represent a small window with a length M for each extracted raw waveform for the input signal received by each channel of the microphone array. As depicted, the set of raw waveforms 102a may be generated for C channels, which are denoted as $x_1[t] \in \mathfrak{R}^M$ for channel 1 and $x_C[t] \in \mathfrak{R}^M$ for channel C. The set of raw waveforms 102a are then convolved with the set of filters 102b, denoted as $h_1 \in \mathfrak{R}^{N \times P}$ for channel 1 and $h_C \in \mathfrak{R}^{N \times P}$ for channel C. For example, the raw waveform for channel 1, $x_1[t]$, is convolved with the filter for channel 1, $h_1$. As depicted, each channel has N taps from among a spatial filterbank that includes P total filters. For instance, the spatial filterbank may be a finite impulse response (FIR) spatial filterbank. The output of the convolution generates the processed signal output 104a for each channel, denoted as $y_C[t] \in \mathfrak{R}^{M-N+1 \times P}$.

The summator 112 receives the processed signal outputs 104a for each channel and sums each of the processed signal outputs 104 across all channels, C, to generate the filterbank output 104b. the summator 122 then sends the filterbank output 104b to the post-processor 114, which max pools the received filterbank output 104b over the entire time length of the output signal, represented by M−N+1. The post-processor 113 then applies a rectified non-linearity, followed by a stabilized logarithm expression to produce the frame level feature vector 106, denoted as $z[t] \in \mathfrak{R}^{1 \times P}$. The frame-level feature vector 106 is then sent to the frequency convolution layer 122 of the CLDNN 120. More particular descriptions of the time convolution processes are described in FIG. 1B.

The frequency convolution layer 122 performs a frequency convolution on the frame-level feature vector 106 (also referred to as a "time-frequency feature representation"), which is outputted by the time convolution layer 110. This may, for instance, be performed to reduce spectral variations in the input signals, $x_c[t]$, for each channel C. The Frequency convolution layer 122 may include one convolutional layer with a plurality of feature maps. For example, frequency convolution layer 122 may include 256 feature maps. In such an example, an 8×1 frequency-time filter may be used for the convolutional layer. The pooling strategy associated with frequency convolution layer 122 may include non-overlapping max pooling and, for instance, with pooling in frequency only being performed with a pooling size of 3. The output of the frequency convolution layer 220 is passed to LSTM layers 124a-124c, which are appropriate to modeling the signal with respect to time.

As shown in FIG. 1A, in some implementations, three LSTM layers may be used to model the signal. In such implementations, each LSTM layer may include 832 cells and a 512 unit projection layer for dimensionality reduction. In other implementations, greater than three LSTM layers, including fewer cells, may alternatively be used. The output of the LSTM layers 124a-124c is be provided to one or more DNN layers 126.

The layers that are included in one or more DNN layers 240 may be fully-connected and, in some implementations, may each have 1,024 hidden units. The time convolution layer 110 may be trained jointly with the rest of the CLDNN 120. Filtering techniques are utilized in the time convolution layer 110, such as those described below in association with FIG. 1B, may be adapted in accordance with such training.

During training, the CLDNN 120 may be unrolled for 20 time steps for training with truncated backpropagation through time (BPTT). In some implementations, the output state label may be delayed by one or more frames, as information about future frames may enhance the accuracy of predictions associated with a current frame. In examples that include providing audio data corresponding to an utterance as input, the output targets 108 of the raw waveform CLDNN 120 may provide for transcription of the utterance.

Figure 1B:
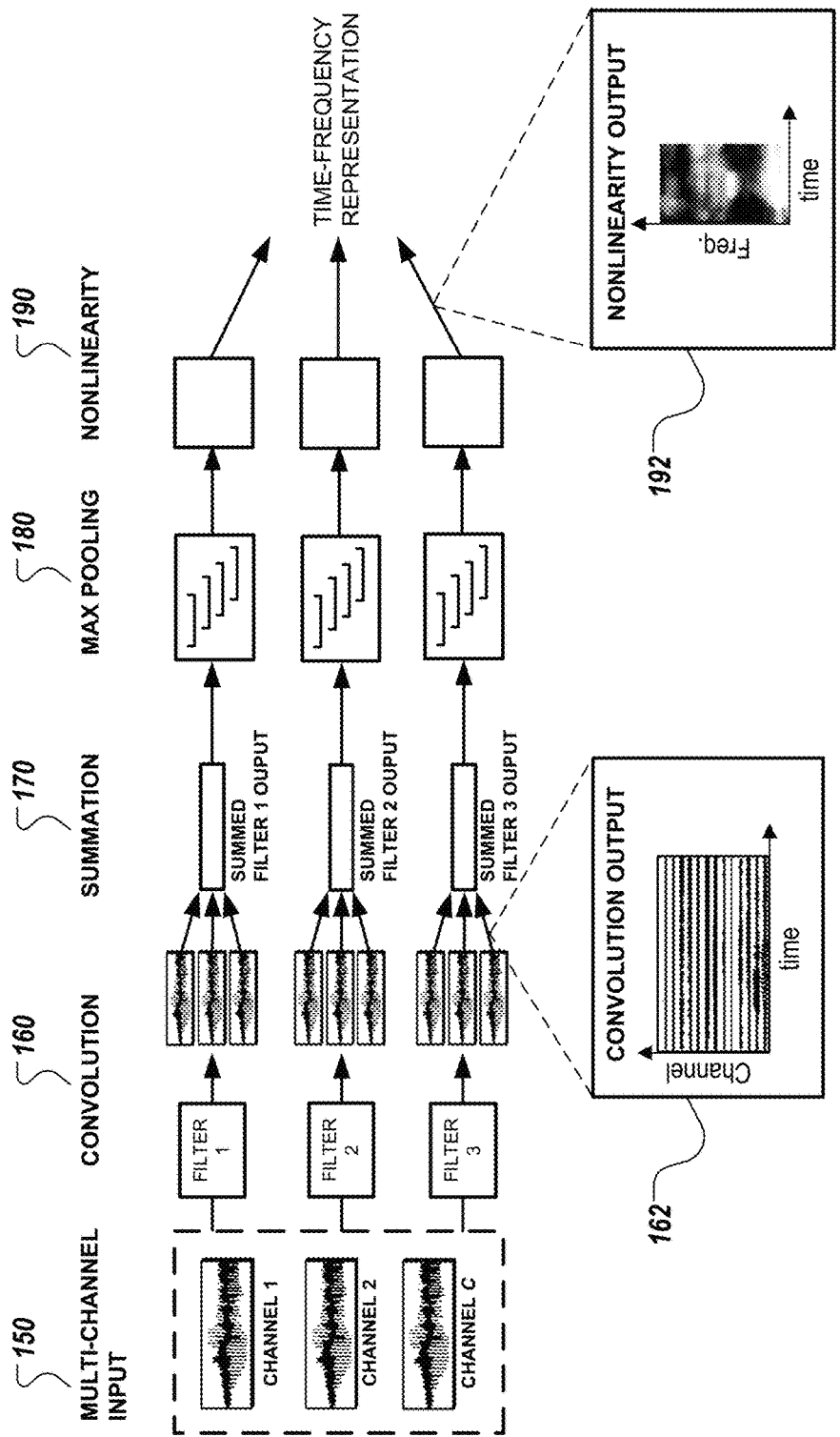
FIG. 1B illustrates a conceptual diagram of an exemplary framework for processing multi-channel audio waveforms in a time-domain convolution layer.

FIG. 1B illustrates a conceptual diagram of an exemplary framework for processing multi-channel audio waveforms in the time convolution layer 110. The time convolution layer 110 determines the set of frame-level feature vectors from the set of raw waveforms 150 from multiple channels, C. In some implementations, the set of frame-level feature vectors may include gammatone features. The output of time convolution layer 110 may be provided to the CLDNN 120, as described above with respect to FIG. 1A.

The set of raw waveforms 150 may be provided to the time convolution layer 110 as audio data input from multiple channels, C, of a microphone array. For example, the set of raw waveforms 150 may be audio data corresponding to an utterance. In some implementations, the set of raw waveforms 150 may be a relatively small window, e.g., 25 to 35 milliseconds, of raw waveform samples of length M. The raw waveform for each channel from set of raw waveforms 150 may be convolved with a filter from a spatial filterbank 160 that includes P filters. In some implementations, one or more characteristics of filterbank 160 may be adaptive so as to enable filterbank learning. Each convolutional filter of filterbank 160 may be, for instance, a finite impulse response ("FIR") filter with a length of N. For example, an output from the convolution may be M−N+1×P in time×frequency. An exemplary convolution output of filterbank 160 for a single channel can be seen at 162.

The convolution output of filterbank 160 may then be summed across all channels, C, to generate a summed filterbank output 170. The output of the summation, e.g., summed convolution output 170, may be collapsed in time using a pooling function 180. This may discard short term phase information, such as phase shifts produced as a result of time-domain filtering. Such phase shifts may, for instance, exist between sinusoidal components of the raw waveform. In some implementations, the pooling function 180 may be applied over the entire time length of the convolution output to produce 1×P outputs. Rectified non-linearity, e.g., half-wave rectification, and a stabilized logarithm compression may be applied to the collapsed output, at 190, to produce a frame-level feature vector at time t, which may be denoted as:

$$z[t] \in \Re^{1 \times P} \qquad (1)$$

In some implementations, the stabilized logarithm may be applied using a relatively small additive offset, e.g., log(·+ 0.01)), to truncate the output range and avoid numerical problems with very small inputs. An exemplary frame-level feature vector, which is also herein referred to as a "time-frequency feature representation," can be seen at 192. The window of the raw waveform may be subsequently shifted, e.g., by 10 milliseconds, and the processes described above in association with time-domain convolution layer 110 may be repeated for the next windowed signal. This may provide a set of time-frequency frames at 10 ms intervals. In some implementations, one or more time-averaging operations may be performed over a window to compute frame-level time-frequency features. It should be noted that the time-frequency feature representation is not a log-mel feature, but rather, tailored to the particular task at hand, such as word error rate minimization.

The time convolution layer 110 is trained jointly with the CLDNN 120. For example, in one implementation, during training, the CLDNN 120 is unrolled for 20 time steps for training and truncated backpropagation through time (BPTT). In addition, the output state label is delayed by five frames. In some instances, information about future frames helps predict the current frame.

In one example, the CLDNN 120 may be trained using training data, e.g., about 2,000 hours of noisy training data consisting of 3 million English utterances. In some implementations, the training data is created by artificially corrupting clean utterances using a room simulator, adding varying degrees of noise and reverberation. The utterances are anonymized and hand-transcribed voice search queries, and are representative of voice search traffic. Noise signals, which include music and ambient noise sampled from YouTube and recordings of "daily life" environments, are added to the clean utterances at SNRs ranging 0 to 20 dB, averaged at approximately 12 dB. Reverberation is simulated using an image model with room configurations that are randomly sampled from 100 possible room sizes with T60s between 400 ms and 900 ms, and an approximate average of 600 ms. The simulation also assumes an 8-channel linear microphone array, where each microphone is spaced 2 centimeters (cm) apart. In such implementations, both noise and target speaker locations change from utterance to utterance and the distance between the sound source and the microphone array is chosen between 1 to 4 meters.

An evaluation set, e.g., a separate set of about 30,000 utterances, representing over 20 hours of speech, may be used to evaluate performance of a model. A simulated set is created similarly to the training set under similar signal to noise ratio (SNR) and reverberation settings. In such implementations, the room configurations, SNR values, T60 times, and target speaker and noise positions in the evaluation set are not identical to those in the training set. The microphone array geometry between the training and simulated test sets may be identical.

In one implementation, a real recorded test set is obtained by first re-recording an evaluation set and noises individually in a room, using an 8-channel linear microphone array with microphones placed 4 cm apart. In such an implementation, the target speaker is placed in broadside and offbroadside positions, with the angles of arrival at 90 degrees and 135 degrees, respectively. Noise sources are placed at 30 degrees, 75 degrees, 105 degrees, and 150 degrees. A final noise set may also be obtained by recording noise in a cafe during lunch-time using the same microphone array, and may be used to evaluate performance of the system in diffuse noise conditions. The re-recorded utterances and noise are mixed at SNRs ranging 0 to 20 dB using the same distribution as used to generate the simulated evaluation set.

The architecture of the system 100, as described in FIGS. 1A-1B, may include various features. For instance, in some implementations, the time convolution layer 110 may compute the frame-level feature vectors 106 with a time-domain filter size of 25 ms, with N=400 at a sampling rate of 16 kilohertz (kHZ). The window size used for the convolution is 35 ms (M=560), giving a 10 ms pooling window, which generates similar phase invariance to log-mel features. The raw waveform features are computed every 10 ms. In some instances, varying the number of time-convolution filters P can provide different results.

The system 100 may be used for different channel configurations. In some instances, the CLDNN 120 are trained on a single channel, where C=1. In other instances, multiple channels may be used for training the CLDNN 120, where C=2, 4 or 8. In such instances, various microphone configurations may be used with various values specified for C. For example, when C=2, channels 1 and 8 may be used with a 14 centimeter (cm) spacing. In another example, when C=4, channels 1, 3, 6, and 8 may be used with 14 cm array span may be used, with adjacent microphone spacings, e.g., 4 cm, 6 cm, and 4 cm.

All neural networks can be trained with the cross-entropy criterion, using asynchronous stochastic gradient descent (ASGD) optimization. As an example, networks may have 13,522 CD output targets. The weights for CNN and DNN layers are initialized using the Glorot-Bengio strategy, while all LSTM layers may be randomly initialized using a uniform distribution between −0.02 and 0.02. In addition, an exponentially decaying learning rate, which starts at 0.004 and has a decay rate of 0.1 over 15 billion frames, may be used.

Figure 2:
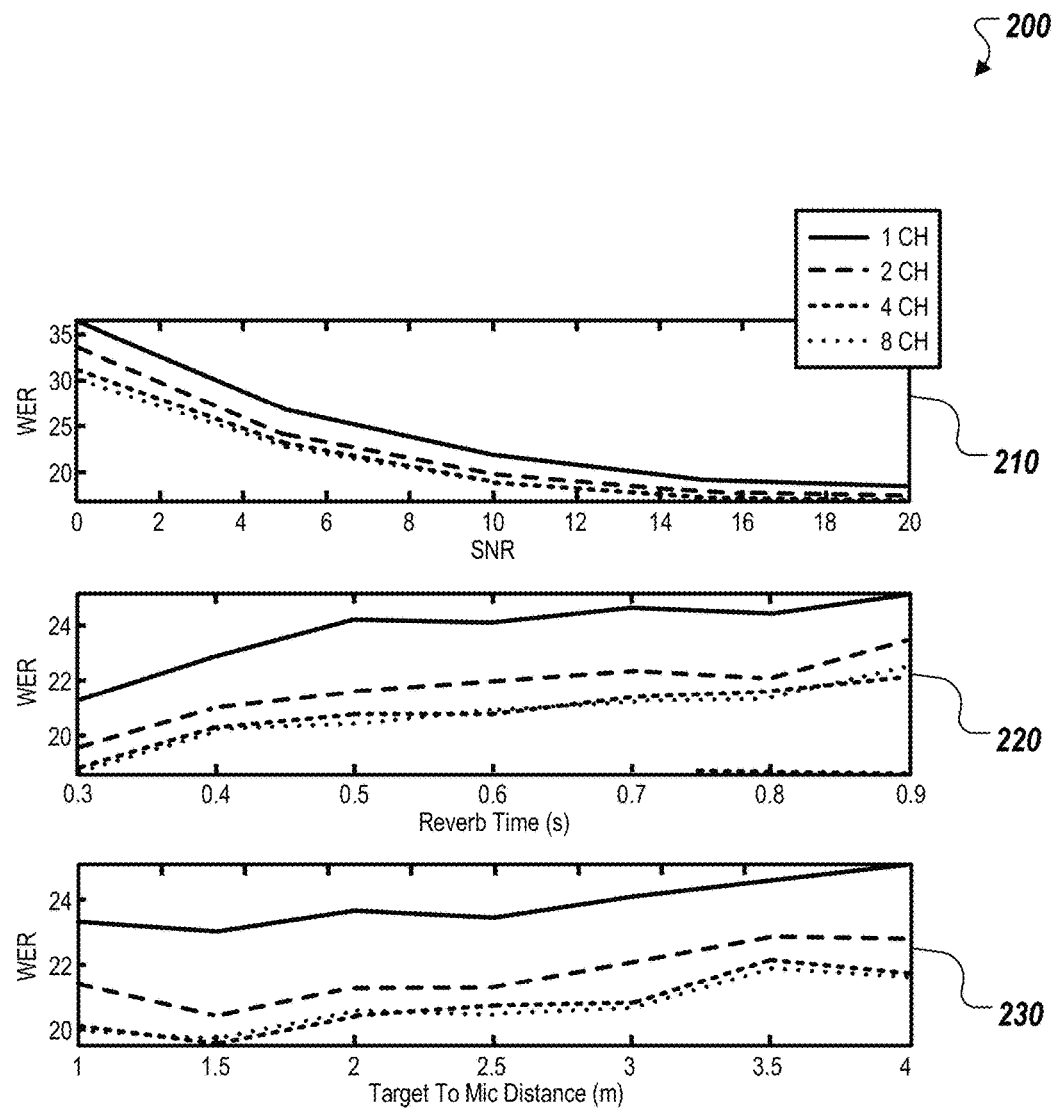
FIG. 2 is a diagram that illustrates analysis of word error rate for various multi-channel waveforms.

FIG. 2 is a diagram that illustrates analysis of word error rate for various multi-channel waveforms. As depicted, audio signals may be enhanced by using multi-channel raw waveform processing techniques as described in FIGS. 1A-1B. The graphs 210-230 depicts results of experiments comparing the performance of different audio waveform processing techniques using different number of channels. For example, graph 210 indicates that the word error rate (WER) is reduced for different signal-to-noise ratios as the number of channels is increased, graph 220 indicates that the WER is reduced for different reverb times, and graph 230 indicates that the WER is reduced for different target microphone distances.

Figure 3A:
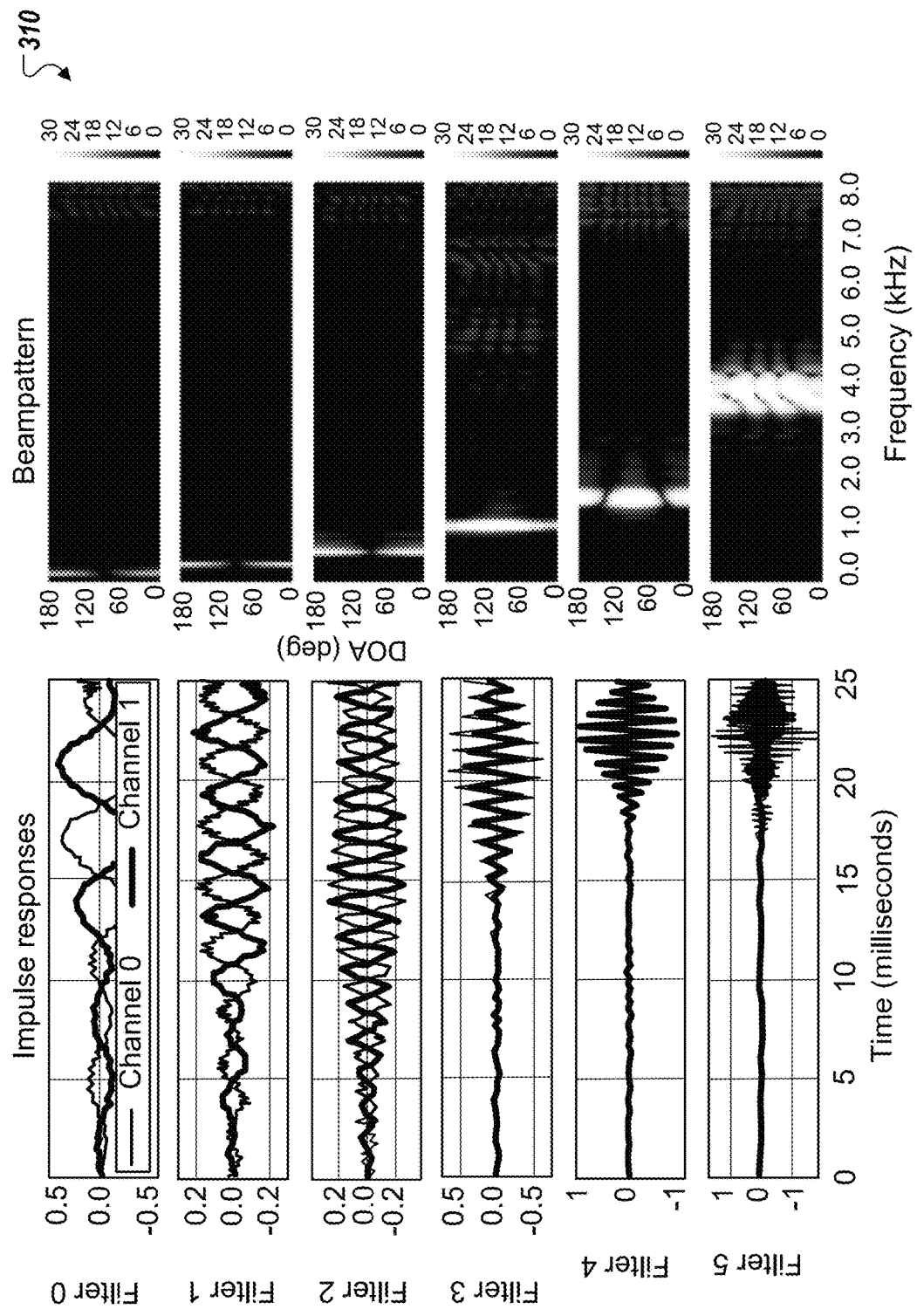
FIGS. 3A-3C represent exemplary performance results for acoustic modelling using multi-channel raw waveforms.
Figure 3B:
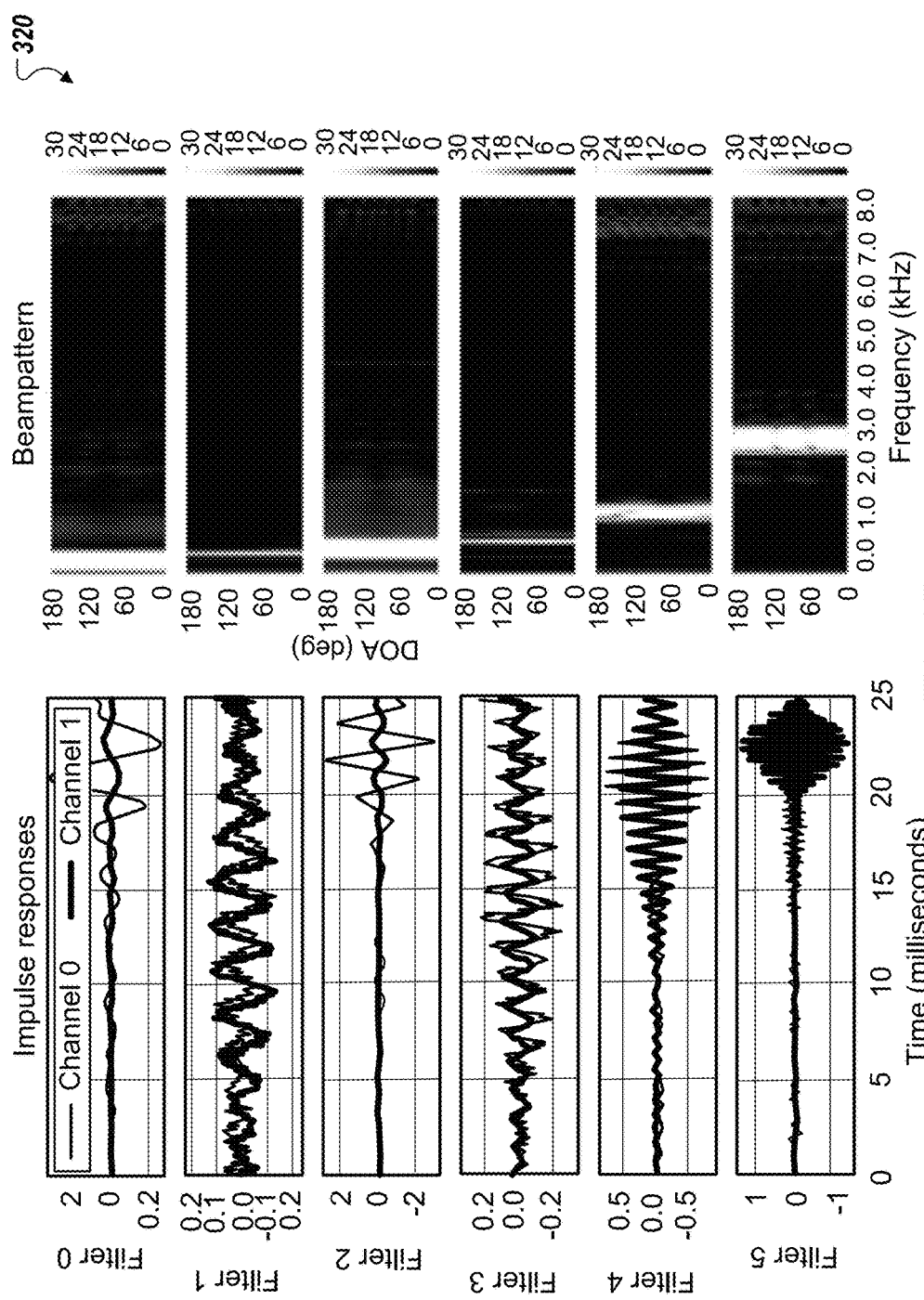
Figure 3C:
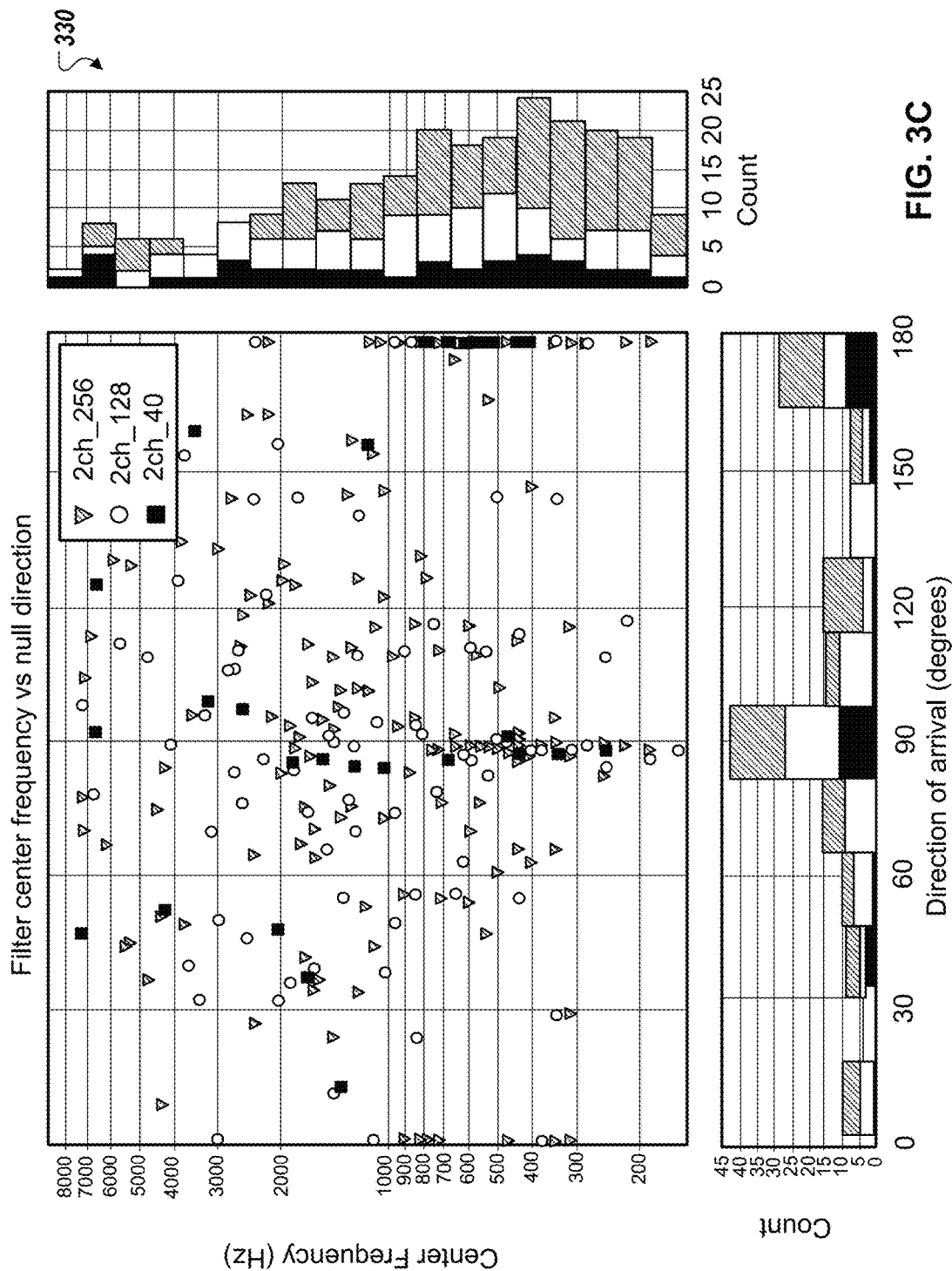

FIGS. 3A-3C represent exemplary performance results for acoustic modelling using multi-channel raw waveforms. Briefly, FIG. 3A illustrates an example of trained filters and spatial responses for a 2-channel network, FIG. 3B illustrates a scatter plot of filter response frequencies vs. null directions for example models, and FIG. 3C illustrates an example of trained filters and their spatial responses learned using multi-geometry training data.

FIG. 3A illustrates a plot 310 of a set of trained filters for different channels of a two-channel network and corresponding learned spatial responses (e.g., beampatterns). The beampatterns are created by sweeping an impulse from 0 to 180 degrees, known as the direction-of-arrival (DOA), and plotting the magnitude response of the output from the time convolution layer (e.g., $z[t]$ mentioned above) for each impulse response. This gives a 2D plot with respect to DOA (in degrees) and frequency (in kHz). For each frequency band, a lighter color in the beam pattern indicates that sounds from those angles are passed through. A darker color shows that an angle at a specific frequency is not passed through, known as a null. The figure shows that the network learns a set of filters at different time delays in each channel. The difference in time delays indicates that the filter steers nulls in different directions, as reflected by the nulls at different frequencies in the beam pattern plots. Furthermore, each filter learns to concentrate in a frequency range, showing that the network is doing both spatial and spectral filtering jointly.

FIG. 3B illustrates a scatter plot 320 of filter maximum response frequency vs. null direction for models with 40, 128, and 256 filters. For instance, because each filter has a fixed directional response, a limited number of filters limits the ability of the network to exploit directional cues. By increasing the number of filters, the spatial diversity of the learned filters can potentially be improved and therefore allow the network to better exploit directional cues as illustrated in FIG. 3B. The histogram at the bottom of the figure indicates that as the number of filters is increased from 40 to 256, the diversity of null directions increases. "Null direction" is computed as the direction of minimum response for filters where the minimum response is at least 6 dB below the maximum. (Filters for which minimum and maximum directional responses differ by less than 6 dB are not included in the plot.)

To further understand the benefit of changing the number of filters in terms of recognition performance, WER can be assessed as a function of the difference between angle of arrival (AOA) of speech and noise. As the number of filters is increased, improvements in performance are obtained across all angles, including in conditions where the speaker and the noise are closer together. The network is thus effective in focusing on the speaker, inferring the steering delay estimate and appropriate filter estimates implicitly. This is in contrast to the model-based approaches that would obtain such estimates from a run-time, possibly iterative, optimization process. Due to the implicit nature of the joint training of the raw waveform CLDNN, the reasons for beamforming gains of different magnitude for different angles are not always apparent.

Assessments of WER can also be performed for multiple-channels and numbers of filters. For 2 channels, improvements may saturate at approximately 128 filters, while for 4 and 8 channels, improvements continue at 256 filters. As the number of channels is increased, more complex spatial responses can be learned, and therefore the network can benefit from more filters.

Note that the CLDNN models discussed above do not explicitly estimate the time delay of arrival (TDOA) of the target source arriving at different microphones, which is commonly done in beamforming. TDOA estimation is useful for two reasons. First, time aligning and combining signals steers the array such that the speech signal is enhanced relative to noise sources coming from other directions. Second, explicitly time aligning signals can make the overall system robust to differences in microphone geometry between the testing and training environments.

In some implementations, a multichannel raw waveform CLDNN without knowledge of the TDOA performs as well as or better than a delay-and-sum ("D+S") approach and a time-aligned multichannel ("TAM") approach that each do use true TDOA information. In general, as the number of channels used increases, D+S continues to improve, as the signal quality improves and the noise is suppressed. Also, TAM generally does better than D+S, as TAM is more general than D+S because it allows individual channels to be filtered before being combined. Nevertheless, the raw waveform CLDNN, without any time alignment (and therefore without any need for a TDOA estimate), can perform as well as TAM with the time alignment. This indicates that the trained un-aligned network is implicitly robust to varying TDOA.

In some instances, not estimating the TDOA may cause a network to be less robust to mismatches in microphone geometry between training and test. For example, a network may learn to filter out noise according to its position relative to the target speaker signal. When the microphone spacing changes, or the position of target speaker and noise change, the network may not adequately adapt to the resulting change of delay.

To make a network more robust to mismatched channels, a "multi-geometry" data set may be generated and used to train a network. For example, a new 2-channel data set can be selected as randomly sampled, with replacement, pairs of 2 channels from the original 8-channel array to create the "multi-geometry" data set. When a single network is trained on multiple geometries, the network learns to handle varying microphone spacings. In addition, if a single channel is repeated twice during decoding, the network recovers the performance of a single channel system. This indicates that a single multi-channel network can be used for single and multi-channel tasks. In addition, this shows that an MTR-type approach to beamforming, where the network is given a variety of microphone configurations during training, allows the network to be robust to different configurations during test.

FIG. 3C illustrates a plot 330 of exemplary filters learned from sampling all pairs of channels. The filters are different than filters learned in FIG. 3A. Specifically, the filters do not learn to steer nulls, but learn to suppress and enhance certain channels. In other words, the network appears to handle candidate beamforming patterns for varying steering directions and varying microphone configurations, and appears capable to infer the optimization with the upper layers of the network. This is in contrast to the model-based estimation model and is a much more practical setup to combine enhancement and acoustic modeling in a single framework with a consistent optimization criterion.

The techniques discussed above may be used to perform beamforming jointly with acoustic modeling, using the raw-waveform CLDNN 120 as described in FIG. 1A. The raw-waveform CLDNN 120 offers improvements over log-mel CLDNNs, for both single and multiple channels. Analysis shows that the raw waveform model is robust to varying TDOA, and does as well as both D+S and TAM trained with the true time alignment. Finally, by training on multiple input configurations results in a model that is robust to a wide range of microphone spacings.

Figure 4:
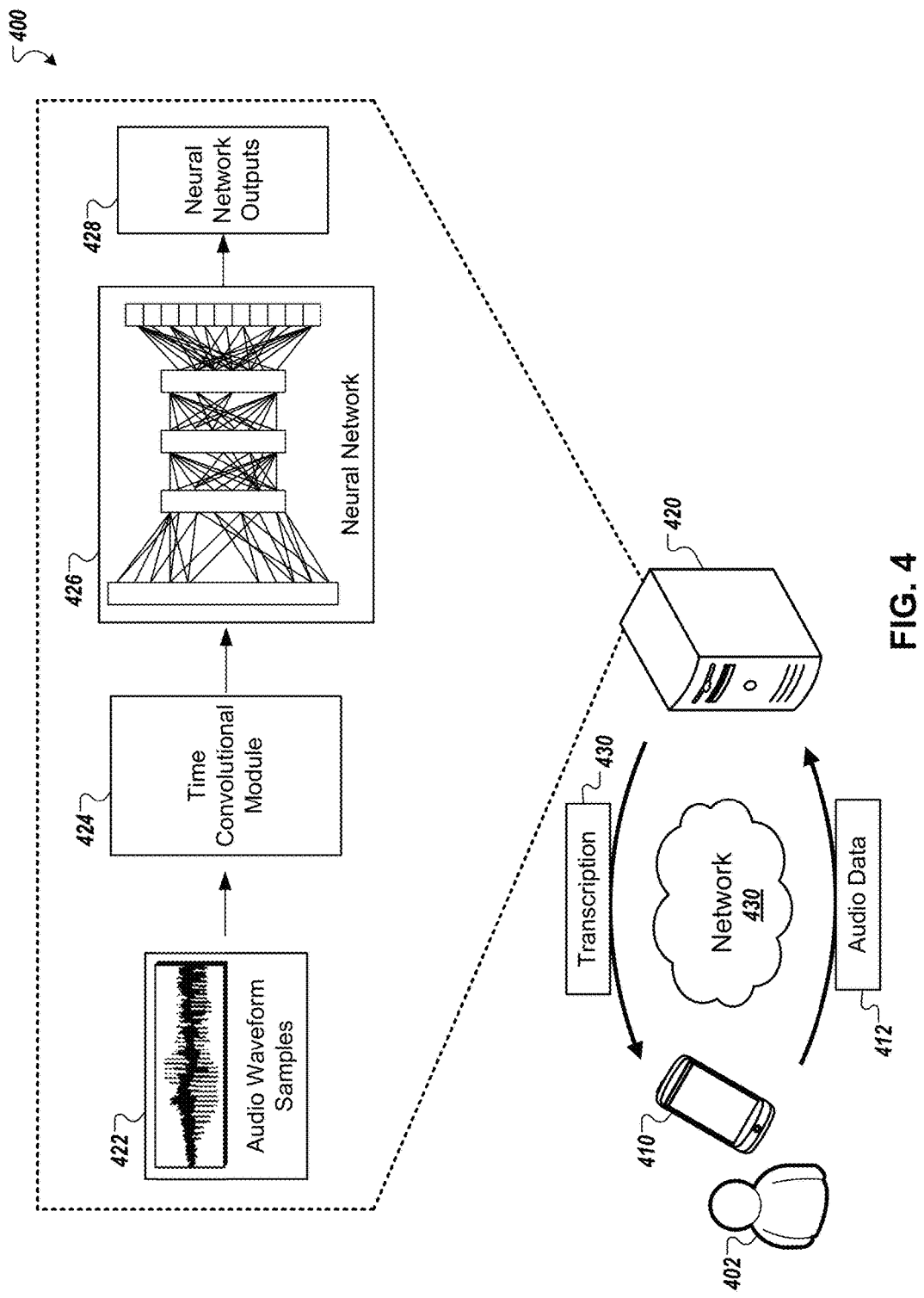
FIG. 4 is a block diagram that illustrates an example of a system for speech recognition using neural networks.

FIG. 4 is a block diagram that illustrates an example of a system 400 for speech recognition using neural networks. The system 400 includes a client device 410, a computing system 420, and a network 430. In the example, the computing system 420 provides information about an utterance and additional information to a neural network 426. The computing system 420 uses output from the neural network 426 to identify a transcription for the utterance.

In some implementations, the computing system 420 receives a set of audio waveform samples 422. The computing system may receive data indicative of a time-frequency representation based on a set of audio waveform samples 422. The computing system 420 may provide, as input to a neural network, the time-frequency representation based on a set of audio waveform samples 422. The computing system 420 may determine a candidate transcription for the utterance based on at least an output of the neural network 426.

In the system 400, the client device 410 can be, for example, a desktop computer, laptop computer, a tablet computer, a wearable computer, a cellular phone, a smart phone, a music player, an e-book reader, a navigation system, or any other appropriate computing device. The functions performed by the computing system 420 can be performed by individual computer systems or can be distributed across multiple computer systems. The network 430 can be wired or wireless or a combination of both and can include the Internet.

In the illustrated example, a user 402 of the client device 410 speaks, and the client device 410 records multi-channel audio that includes the speech. The client device 410 transmits the recorded audio signal 412 to the computing system 420 over the network 430.

The computing system 420 receives the audio signal 412 and obtains audio waveform samples 422. For example, the computing system 420 may identify a set of audio waveform samples 422 that occur within a time window of audio signal 412. These audio waveform samples may as described above in reference to FIGS. 1A-1B.

The computing system 420 may provide audio waveform samples 422 to a time convolutional module 424. The time convolutional module 424 may correspond to time convolutional layer 110, as described in association with FIG. 1A above. As such, the time convolutional module 424 may generate a time-frequency feature representation based on the audio waveform samples 422.

In the illustrated example, the computing system 420 provides output of time convolutional module 424 to the neural network 426. The neural network 426 has been trained to act as an acoustic model. For example, the neural network 426 indicates likelihoods that time-frequency feature representations correspond to different speech units when the time-frequency feature representations are output by time convolutional module 424 and based on audio waveform samples 422. The neural network 426 may, for instance, correspond to layers 122 to 126 of the raw waveform CLDNN 120, as described in association with FIG. 1A above.

The neural network 426 produces neural network outputs 428, which the computing system 420 uses to identify a transcription 414 for the audio signal 412. The neural network outputs 428 indicates likelihoods that the speech in a particular window, for example, $w_1$ corresponding to an acoustic feature vector $v_1$, within the audio waveform samples 422 represents to specific phonetic units. In some implementations, the phonetic units used are phones or components of phones. In the example, the potential phones are referred to as $s_0 \ldots s_m$. The phones may be any of the various phones in speech, such as an "ah" phone, an "ae" phone, a "zh" phone, and so on. The phones $s_0 \ldots s_m$ may include all of the possible phones that may occur in the audio waveform samples 422, or fewer than all of the phones that may occur. Each phone can be divided into three acoustic states. In some implementations, these phonetic units are context-dependent of context-independent hidden markov model (HMM) states of phones.

The neural network outputs 428 provide predictions or probabilities of acoustic states given the data included in the audio waveform samples 422. The neural network outputs 428 can provide a value, for each state of each phone, which indicates the probability that acoustic feature vector $v_1$ represents the particular state of the particular phone. For example, for a first phone, $s_0$, the neural network outputs 428 can provide a first value that indicates a probability $P(s_{0\_1}|X)$, which indicates a probability that the window $w_1$ includes the first acoustic state of the so phone, given the set of input, X, provided at the input layer 271. For a first phone, $s_1$, neural network outputs 428 can provide a second value indicating a probability $P(s_{0\_2}|X)$, indicating a probability that the window $w_1$ includes the second acoustic state of the so phone, given the set of input, X, provided at the audio waveform samples 422. Similar outputs can be provided for all states of all of the phones $s_0 \ldots s_m$.

The computing system 420 provides different sets of acoustic feature vectors to the neural network 426 to receive predictions or probabilities of the acoustic states in different windows. The computing system 420 may apply a sliding window to the acoustic feature vectors to select different sets. In this manner, the computing system 420 may obtain outputs corresponding to each position of the sliding window across the acoustic feature vectors.

The computing system 420 may provide the neural network outputs 428 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 414 may be derived. The computing system 420 then provides the transcription 414 to the client device 410 over the network 430.

The time convolutional module 424 and the neural network 426 may be jointly trained. That is, both the time convolutional module 424 and the neural network 426 have one or more trainable parameters. In some implementations, the time convolutional module 424 includes a set of learning filters. In these implementations, such joint training may include providing training data, such as multi-channel audio waveform samples, to time convolutional module 424 and, in turn, providing time-frequency feature representations to the downstream neural network 426. The filter parameters of the time convolutional module 424, which implement beamforming, and the neural network parameters, which implement the acoustic model, are both adjusted during training iterations. As a result, the neural network 426 may be trained as the set of filters of the time convolutional module 424 are learned. In other words, the parameters of time convolutional module 424 and neural network 426 are trained for the model as a whole.

Forward propagation through the neural network 426 produces outputs at an output layer of the neural network. During training, the outputs may be compared with data indicating correct or desired outputs that indicate that the received time-frequency feature representation corresponds to a known acoustic state. A measure of error between the actual outputs of the neural network and the correct or desired outputs is determined. The error is then back-propagated through the neural network to update the weights within the neural network 426.

This training process may be repeated for time-frequency feature representation data generated for audio waveform samples of multiple different utterances in a set of training data. During training, the frames selected for training can be selected randomly from a large set, so that frames from the same utterance are not processed consecutively. Also, as discussed above, the audio samples used for different training operations of a model can be sets of data from different microphone spacings, e.g., different subsets of data channels from a microphone array, and the training using mixed data from various microphone arrangements can improve the robustness of the model to different microphone configurations.

Figure 5:
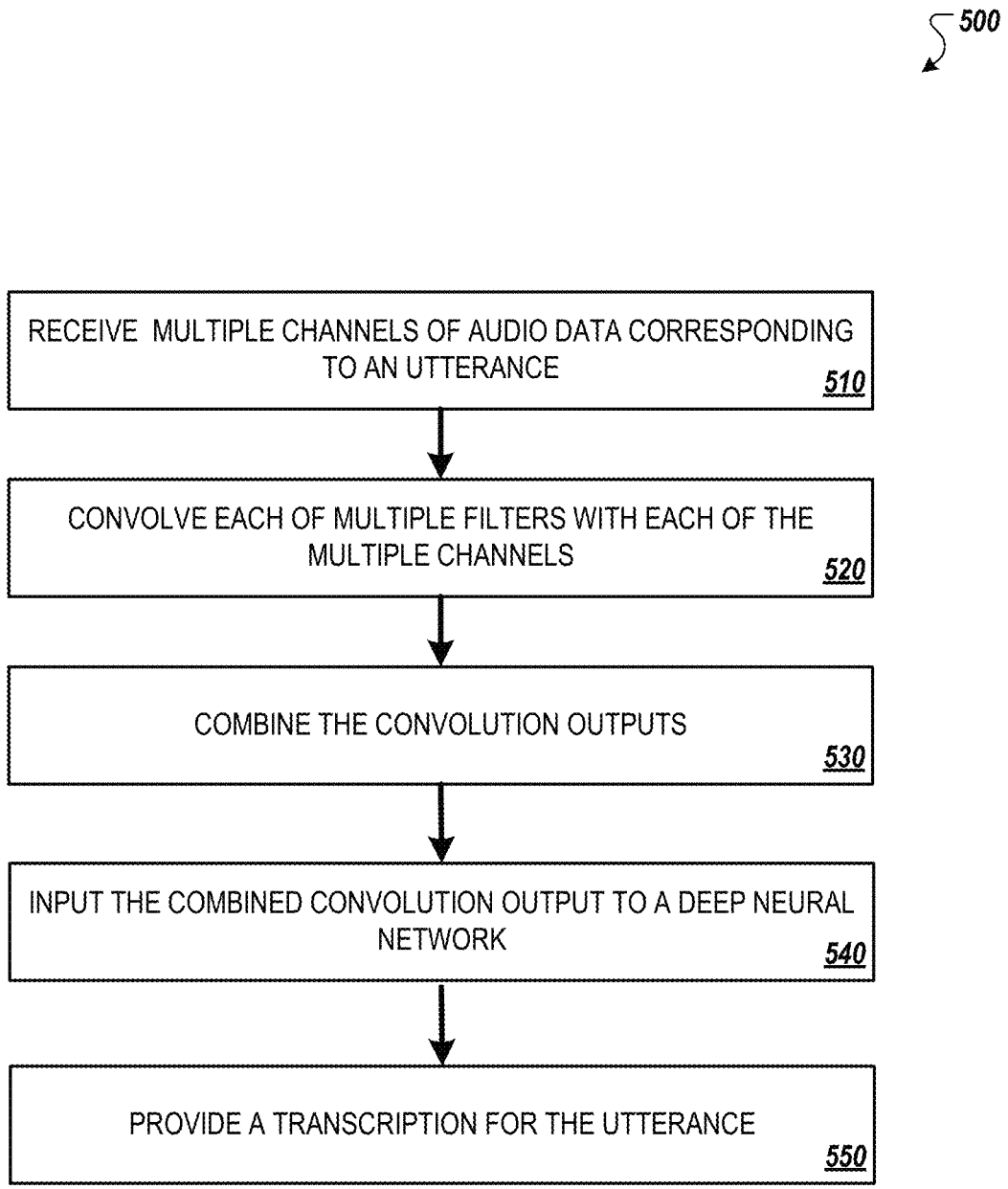
FIG. 5 is a flow diagram that illustrates an example of a process for determining a transcription for an utterance using an output of a trained artificial neural network.

FIG. 5 is a flow diagram that illustrates an example of a process 500 for determining a transcription of an utterance using an output of a trained artificial neural network. Briefly, the process 500 may include receiving multiple channels of audio data corresponding to an utterance (510), convolving each of multiple filters with each of the multiple channels (520), combining the convolution outputs (530), inputting the combined convolution output to a deep neural network (540), and providing a transcription for the utterance (550).

In more detail, the process 500 may include receiving multiple channels of audio data corresponding to an utterance (510). For example, the system 100 may receive multiple channels of audio data that includes the set of raw waveforms 102*a* that correspond to an utterance. In some instances, the set of waveforms 102*a* may be recordings of the utterance by different microphones that are spaced apart from each other.

The process 500 may include convolving each of multiple filters with each of the multiple channels (520). For example, the system 100 may convolve the set of filters 102*b* from a spatial filterbank the set of waveforms 102*a* for each of the multiple channels. The output of the convolution may be the processed signal output 104*a*.

The process 500 may include combining the convolution outputs (530). For example, the summator 112 of the system 100 may combine the processed signal output 104*a* for each of the set of filters 102*b* to generate the filterbank output 105*b*. In some implementations, the filterbank output 104*b* may be further processed by the post-processor 114 to generate the frame-level feature vector 106.

The process 500 may include inputting the combined convolution output to a deep neural network (540). For example, the frame-level feature vector 106 may be inputted into the raw waveform CLDNN 120, which includes the frequency convolution layer 122, the long short-term memory layers 124*a*-124*c* and the deep neural network 126.

The process 500 may include providing a transcription for the utterance (550). For example, the output targets 108 may be used to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription may be derived. The system 100 may then provide the transcription to a client device over a network.

Figure 6:
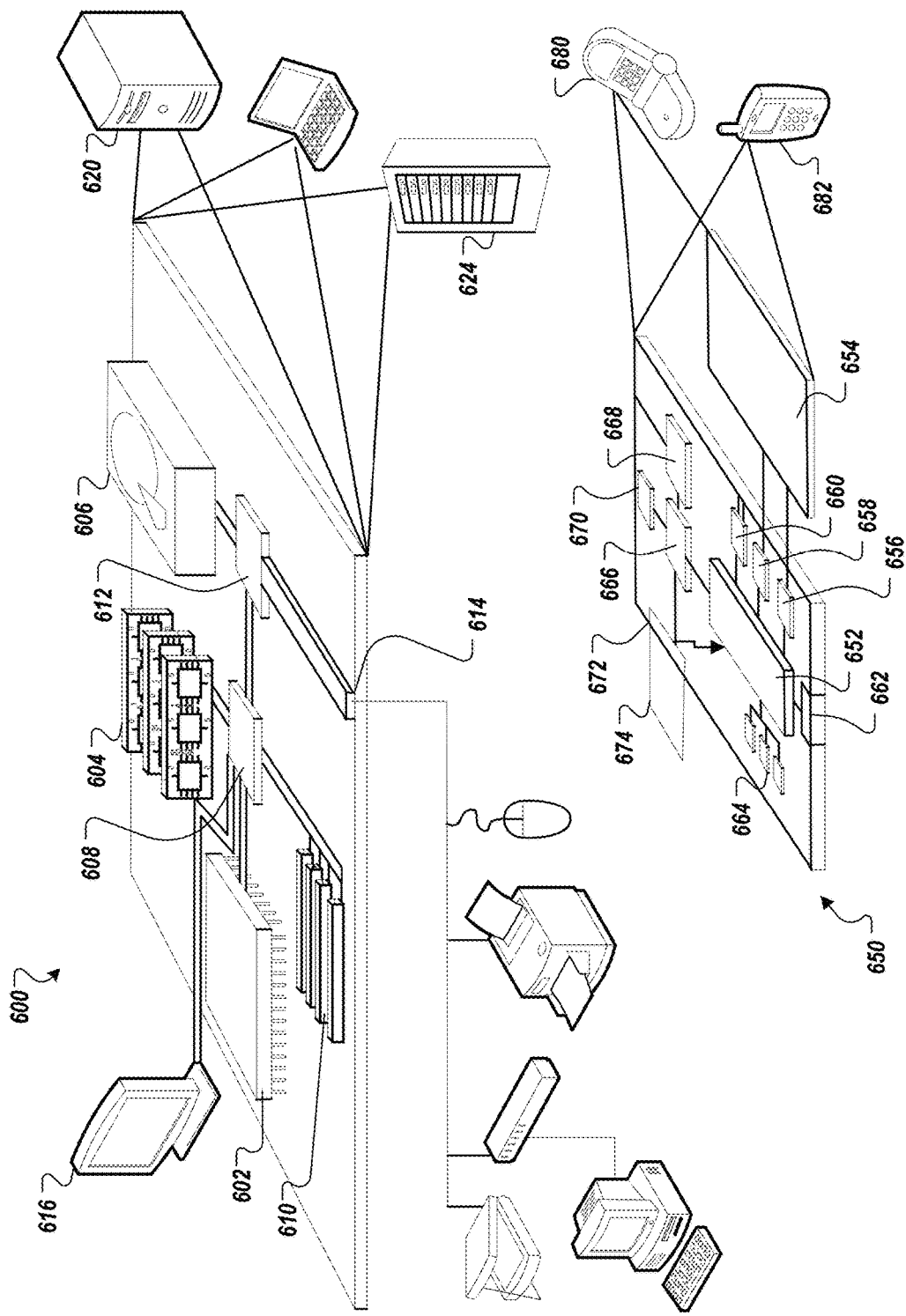
FIG. 6 is a schematic diagram that shows an example of a computing device and a mobile computing device.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives.

The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which may accept various expansion cards (not shown). In the implementation, low-speed controller 612 is coupled to storage device 606 and low-speed expansion port 614. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter. The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, and an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units.

Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound, e.g., voice messages, music files, etc. and may also include sound generated by applications operating on device 650.

The computing device 650 may be implemented in a number of different forms, as shown in the figure. For example, it may be implemented as a cellular telephone 480. It may also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   one or more computers and one or more data storage devices storing instructions that are operable, when executed by the one or more computers, to cause the one or more computers to perform operations comprising:
   receiving multiple channels of audio data corresponding to an utterance;

convolving each of multiple filters, in a time domain, with each of the multiple channels of audio waveform data to generate convolution outputs, wherein the multiple filters have parameters that have been learned during a training process that jointly trains the multiple filters and trains a deep neural network as an acoustic model;

combining, for each of the multiple filters, the convolution outputs for the filter for the multiple channels of audio waveform data;

inputting the combined convolution outputs to the deep neural network trained jointly with the multiple filters; and providing a transcription for the utterance that is determined based at least on output that the deep neural network provides in response to receiving the combined convolution outputs.

2. The system of claim 1, wherein the multiple channels of audio data are multiple channels of audio waveform data for the utterance, wherein the multiple channels of audio waveform are recordings of the utterance by different microphones that are spaced apart from each other.

3. The system of claim 1, wherein the deep neural network is a deep neural network comprising a convolutional layer, one or more long-short term memory (LSTM) layers, and multiple hidden layers.

4. The system of claim 1, wherein the convolutional layer of the deep neural network is configured to perform a frequency domain convolution.

5. The system of claim 3, wherein the deep neural network is configured such that output of convolutional layer is input to at least one of the one or more LSTM layers, and output of the one or more LSTM layers is input to at least one of the multiple hidden layers.

6. The system of claim 1, wherein combining the convolution outputs comprises:

summing, for each of the multiple filters, the convolution outputs obtained for different channels using the filter to generate summed outputs corresponding to different time periods; and pooling, for each of the multiple filters, the summed outputs across the different time periods to generated a set of pooled values for the filter.

7. The system of claim 6, wherein pooling the summed outputs across the different time periods comprises max pooling the summed outputs across the different time periods to identify maximum values among the summed outputs for the different time periods.

8. The system of claim 6, wherein combining the convolution outputs comprises applying a rectified non-linearity to the sets of pooled values for each of the multiple filters to obtain rectified values;

wherein inputting the combined convolution outputs to the deep neural network comprises inputting the rectified values to the deep neural network.

9. The system of claim 8, wherein the rectified non-linearity comprises a logarithm compression.

10. The system of claim 1, wherein the filters are configured to perform both spatial and spectral filtering.

11. The system of claim 1, wherein the training process that jointly trains the multiple filters and trains the deep neural network as an acoustic model comprises training the multiple filters and the deep neural network using a single module of an automated speech recognizer.

12. The system of claim 1, wherein the training process that jointly trains the multiple filters and trains the deep neural network as an acoustic model is performed using training data that includes audio data from a plurality of different microphone spacing configurations.

13. A computer-implemented method comprising:

receiving multiple channels of audio data corresponding to an utterance;

convolving each of multiple filters, in a time domain, with each of the multiple channels of audio waveform data to generate convolution outputs, wherein the multiple filters have parameters that have been learned during a training process that jointly trains the multiple filters and trains a deep neural network as an acoustic model;

combining, for each of the multiple filters, the convolution outputs for the filter for the multiple channels of audio waveform data;

inputting the combined convolution outputs to the deep neural network trained jointly with the multiple filters; and providing a transcription for the utterance that is determined based at least on output that the deep neural network provides in response to receiving the combined convolution outputs.

14. The method of claim 13, wherein the multiple channels of audio data are multiple channels of audio waveform data for the utterance, wherein the multiple channels of audio waveform are recordings of the utterance by different microphones that are spaced apart from each other.

15. The method of claim 13, wherein the deep neural network is a deep neural network comprising a convolutional layer, one or more long-short term memory (LSTM) layers, and multiple hidden layers.

16. The method of claim 13, wherein the convolutional layer of the deep neural network is configured to perform a frequency domain convolution.

17. The method of claim 15, wherein the deep neural network is configured such that output of convolutional layer is input to at least one of the one or more LSTM layers, and output of the one or more LSTM layers is input to at least one of the multiple hidden layers.

18. A non-transitory computer-readable medium storing software comprising instructions executable by one or more computers which, upon such execution, cause the one or more computers to perform operations comprising:

receiving multiple channels of audio data corresponding to an utterance;

convolving each of multiple filters, in a time domain, with each of the multiple channels of audio waveform data to generate convolution outputs, wherein the multiple filters have parameters that have been learned during a training process that jointly trains the multiple filters and trains a deep neural network as an acoustic model;

combining, for each of the multiple filters, the convolution outputs for the filter for the multiple channels of audio waveform data;

inputting the combined convolution outputs to the deep neural network trained jointly with the multiple filters; and providing a transcription for the utterance that is determined based at least on output that the deep neural network provides in response to receiving the combined convolution outputs.

19. The non-transitory computer-readable medium of claim 18, wherein the multiple channels of audio data are multiple channels of audio waveform data for the utterance, wherein the multiple channels of audio waveform are recordings of the utterance by different microphones that are spaced apart from each other.

20. The non-transitory computer-readable medium of claim 18, wherein the deep neural network is a deep neural network comprising a convolutional layer, one or more long-short term memory (LSTM) layers, and multiple hidden layers.

\* \* \* \* \*